Figure 1:
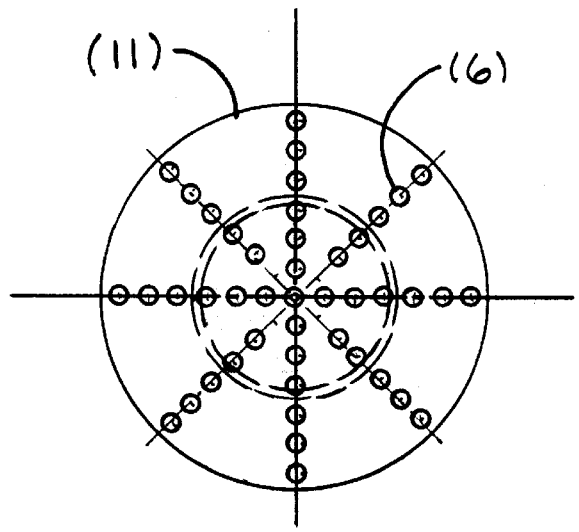

United States Patent

Merrell

Patent Number: 5,806,134
Date of Patent: Sep. 15, 1998

[54] SCRAPE-A-ROUND WINDSHIELD ICE SCRAPER

[76] Inventor: Galen B. Merrell, 8804 S. 1595 East, Sandy, Utah 84093

[21] Appl. No.: 994,485

[22] Filed: Dec. 19, 1997

[51] Int. Cl.⁶ .................................. B60S 1/04; A47L 1/06
[52] U.S. Cl. ..................................... 15/236.02; 15/236.05; 15/236.08; 30/169; 30/172; D32/46
[58] Field of Search ............................ 15/236.01, 236.02, 15/236.05–236.09; D32/46–49; 30/169, 172

[56] References Cited

U.S. PATENT DOCUMENTS

| | | | |
|---|---|---|---|
| D. 46,895 | 2/1915 | Campbell | D32/46 |
| 745,717 | 12/1903 | Donaldson | 15/236.06 |
| 770,647 | 9/1904 | Meeker | 30/169 |
| 1,560,929 | 11/1925 | Woods | 15/236.01 X |
| 1,718,496 | 6/1929 | Smith | 30/169 |
| 2,299,089 | 10/1942 | Haan | 15/236.02 |
| 2,532,429 | 12/1950 | Sparkman | 15/236.02 X |
| 3,090,067 | 5/1963 | Weiby et al. | 15/236.02 |
| 3,133,301 | 5/1964 | Helminen | 15/236.02 X |
| 5,101,529 | 4/1992 | Tippie | 15/236.02 |

FOREIGN PATENT DOCUMENTS 3341529  5/1985  Germany ............................ 15/236.02

*Primary Examiner*—Mark Spisich

[57] ABSTRACT

A cone shaped, hand held windshield ice scraper consisting of two parts, the cone body and the cap. The cap pressure fits into the open cone top, the open cone base is formed by the convergence of equal opposing angles resulting in a relatively sharp ridge about the base circumference. The cone and cap are composed of a soft plyable plastic to facilitate deformation. Raised ridges are arrayed about the cone for stiffening and grip enhancement.

4 Claims, 3 Drawing Sheets

SCRAPE-A-ROUND WINDSHIELD ICE SCRAPER

BACKGROUND—FIELD OF INVENTION

This invention relates to the scraping of ice, frost and snow from windshield and windows of automobiles and trucks.

BACKGROUND—DESCRIPTION OF PRIOR ART

Automobiles and trucks are left outdoors in freezing climate and become covered with ice, frost and snow. We will hereafter refer to these forms of frozen water as frost.

Frost must be removed from windows of automobiles and trucks prior to operation. To remove the frost, a scraper must be used, Thereafter, inventors have created many types of scrapers to perform this task.

Most prior art scrapers are flat ended with a long or short handle, some scrapers have a disc shaped end attached to a handle, some scrapers have a double flat end attached to a handle, some small scrapers are held by the extended fingers and thumb which act as a handle extending from the wrist. We will refer to these prior art scrapers as traditional scrapers.

The traditional scrapers loose effectiveness, in that, pressure applied to the window is reduced by means of transfer thru a fulcrum or the wrist and fingers then further exasarbated by traveling along the length of a handle. The result is lost pressure to the window.

The traditional scrapers loose effectiveness in that they are composed of rigid material. Rigid composition prohibits a scraper from conforming to window curvature. The result is a limited portion of scraping surface touching the window allowing a narrow range of scraping success.

The traditional scrapers are uncomfortable and difficult to grasp. For millions of scraper users who are elderly or those with weak hands and wrists and especially those with arthritis or carpal tunnel syndrom, the use of traditional scrapers is agonizingly painful.

The traditional scrapers have storage problems. The small flat short handled scrapers can be stored anywhere, they are easily lost and difficult to discover in the dark or among clutter. The long handled scrapers are very difficult to store and generally end up tangled with a passengers feet or wedged behind a truck seat.

OBJECTS AND ADVANTAGES

Several objects and advantages of the present invention are:

(a) to provide a scraper which has no handle, the user comfortably grasps the scraper cone, direct pressure is transferred from the shoulder to the hand and to the window.

(b) to provide a scraper composed of a pliable plastic which deforms in the hand to conform to the window curvature, placing all eighteen inches of scraping surface against the window.

(c) to provide a scraping surface formed by the convergence of two equal apposing angles, resulting in a relatively sharp edge about the circumference of the cone base, this results in a scraping surface which:
  (1) throws the frost away from the hand.
  (2) has a double scraping action with each pass, the leading edge throws snow away from the scraper, the trailing edge collects frost within the cone.
  (3) allows equal scraping effectiveness in any direction.
  (4) offers a scrubbing characteristic which leaves the windows cleaner than traditional scrapers.
  (5) has a circumference of approx. eighteen inches and diameter of five and one half inches resulting in fifty percent less time required to scrape windows (d) to provide a scraper which allows a comfortable grasp. This is a great relief for scrapers users who are elderly or those with weak hands and wrists and especially those with arthritis or carpal tunnell syndrome. The use of this invention results in reduced stress to joints, tendons and tissues, compared to similar use of traditional scrapers.

(e) to provide a scraper which can have the cap removed and the cone will double as a funnel for high capacity addition of antifreeze or windshield washing solution, additionally with the cap removed, the cone can be used as a mini mega phone.

(f) to provide a scraper which is bulky enough for obvious discovery yet compact enough for easy storage within the automobile or truck.

DRAWING FIGURES

Figure 2:
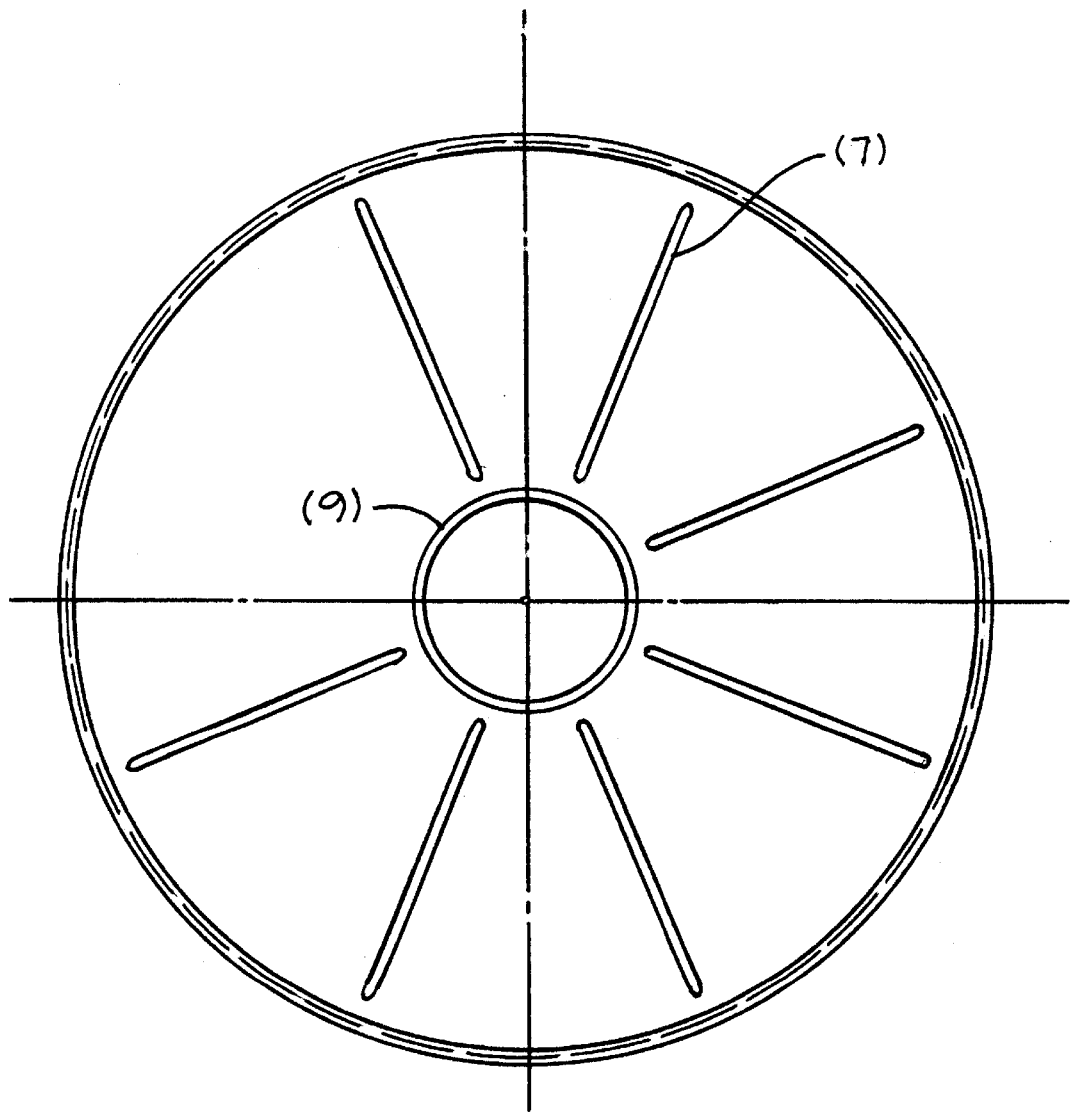
Figure 3:
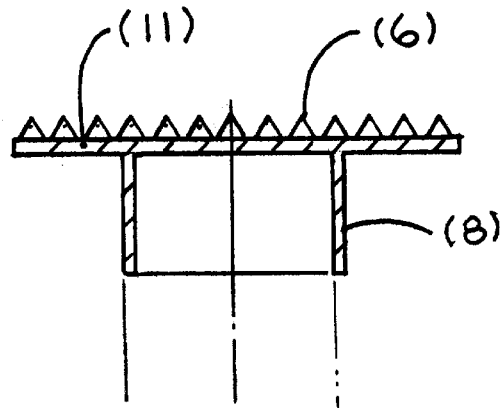
Figure 4:
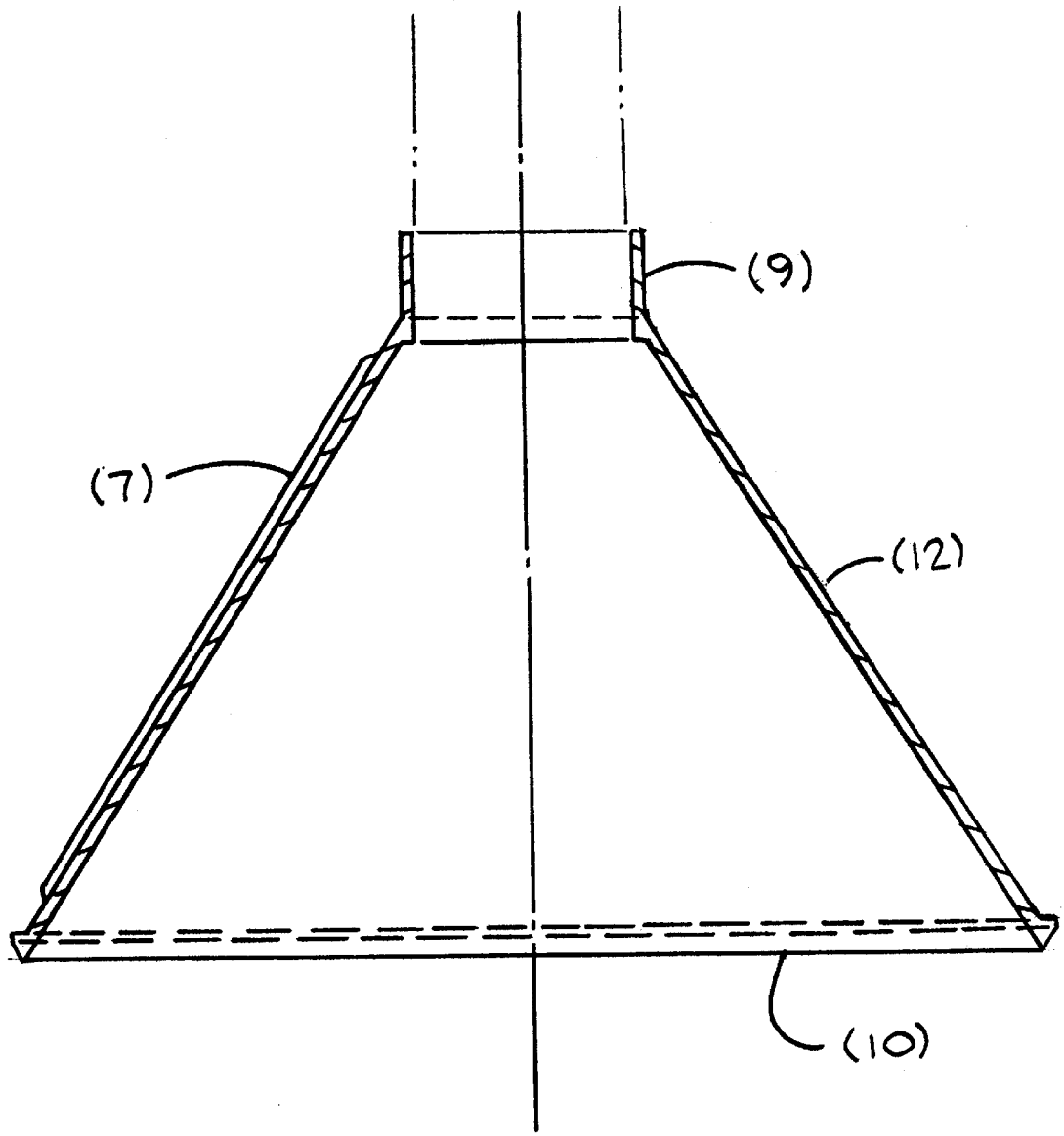
Figure 5:
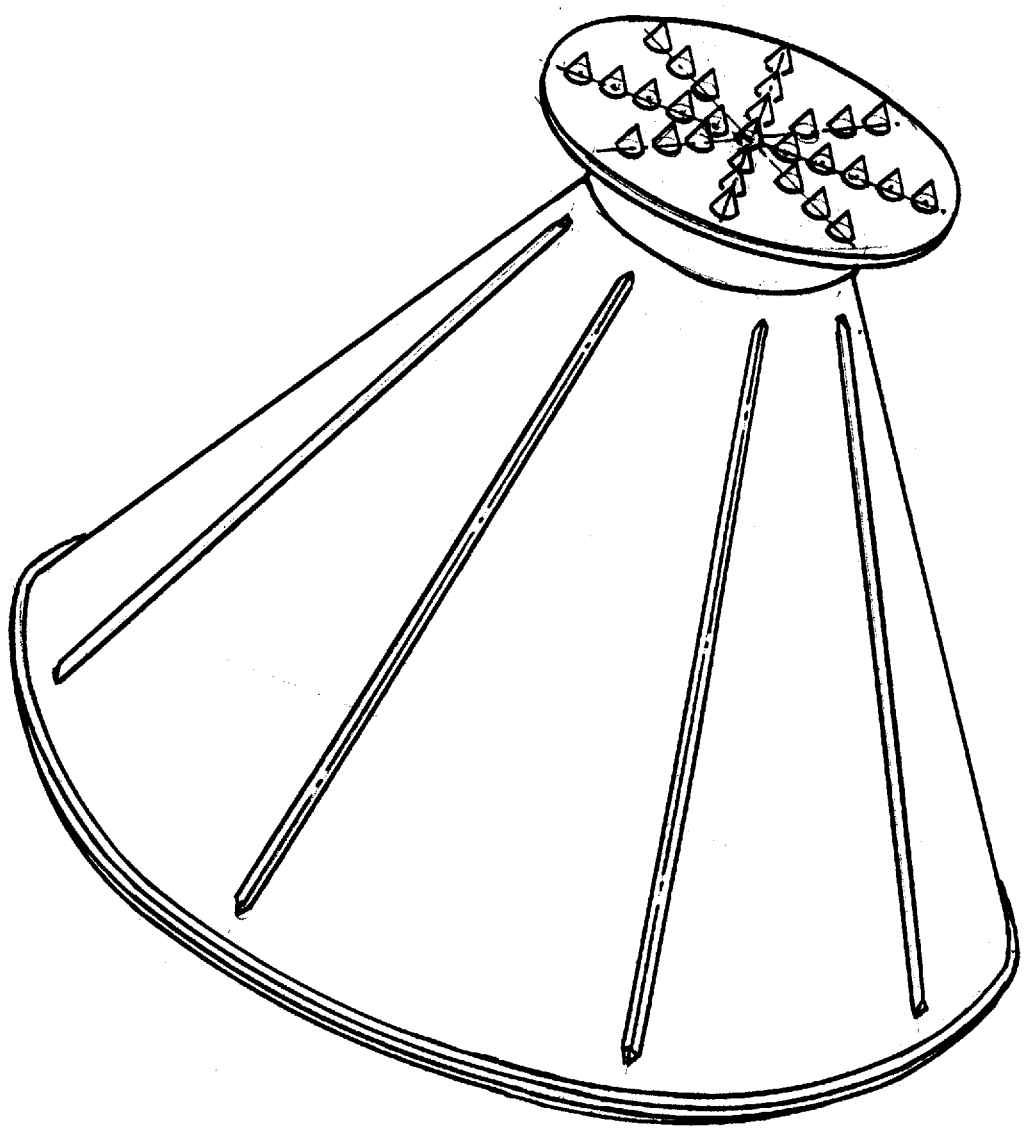

FIG. 1 shows a full scale plan view of the cap.
FIG. 2 shows a full scale plan view of the cone.
FIG. 3 shows a full scale section thru the cap.
FIG. 4 shows a full scale section thru the cone.
FIG. 5 shows a perspective view of the assembled unit.

REFERENCE NUMERALS IN DRAWINGS (6) scraping cones
(7) cone stiffener
(8) cap neck
(9) cone top
(10) cone base
(11) flat disk
(12) cone body

DESCRIPTION—FIGS. 1 to 5

A typical embodiment of the scraper of the present invention is illustrated in FIG. 5 showing a perspective view of the assembled unit, which is comrised of two parts, the cap or hand restraint and the cone body. The cap neck (8) pressure fits into the cone top (9).

The cone FIGS. 2, 4 and cap FIGS. 1, 3 are injection molded and are composed of soft, plyable plastic, such as but not limited to polyethelene, polypropelene, vinyl, nylon, polystyrene or formed of a laminated fibrous material.

The cap, FIGS. 1, 3 is a flat disk (11) of approx. two inch diameter and ⅛ inch thick topped with numerous cones (6) arrayed in a serrated fashion, connected with the flat disk is a neck (8) approx. one inch long with side walls 1/16 inch thick and an outside diameter of one inch.

The cone FIGS. 2, 4 has an open top (9) approx. one inch long with side walls 1/16 inch thick and an inside diameter of one inch. Connected with the top (9) is a cone body (12) approx. four inches tall, with walls of approx. 1/16 inch thick, which flares from the open top (9) to the open base (10). The base (10) has a diameter of approx. five and one half inches. It is formed by the convergence of two equal opposing angles resulting in a relatively sharp ridge about the circumference of said base (10). Stiffeners (7) array the cone body (12) side adding strength and act as grips.

OPERATION

The manner of using the scraper of the present invention to scrape frosted windows, varies from traditional scrapers.

The user comfortably grasps the cone body FIGS. 2, 4, (12), the cap FIGS. 1, 3 acts as a hand restraint. The user places the base (10) against the frosted window and drives the scraper in any direction, using the strength of the upper body, thru the shoulder, transfered directly to the window. The arm, hand, fingers and cone (12) act as a single member.

The user may reverse the position of the scraper—placing the cap end, with serrated cones, against the window and drive the scraper in a circular fashion to loosen coarse frost.

SUMMARY

Accordingly the reader will see that the cone shaped scraper of this invention can scrape frosted windows faster, better and cleaner than traditional scrapers. The advantages of the cone shaped scraper are:

1. it is composed of pliable material allowing the scraper to conform to window curvature.
2. it has no handle, there by allowing direct pressure to the window.
3. it has approx. eighteen inches of effective scraping surface on the windows.
4. it provides for a double scraping action in any direction with each pass.
5. it has a scraping surface which throws frost away from the hand.
6. it has a scraping surface which employs a scrubbing action for cleaner windows.
7. it has serrated cones on the cap to loosen coarse frost.
8. it secures the overall effect of scraping windows in one half the time.
9. it allows for a comforable grasp, giving users relief from scraper agony.

Although the description above contains many specificities, these should not be constued as limiting the scope of the invention but as merely providing illustrations of some of the presently preferred embodiments of this invention. For example, the scraper can have the cap removed and the cone body can be used as a funnel or a mini mega phone etc.

Thus this scope of invention should be determined by the claims and their legal equivalents, rather than by the examples given.

I claim:

1. A windshield ice scraper comprising:

(a) a hollow conical base having an open top portion and an open bottom portion, said top portion being of a smaller diameter than said bottom portion, said bottom portion having a scraping edge formed thereon extending around the periphery thereof and said base further being constructed of a pliable material so that the scraping edge can readily conform to curvatures in the windshield; and (b) a flat disk having a first side and a second side, a neck extending from the first side of the disk, said neck being releasably secured within the open top portion of the base, said flat disk being of a larger diameter than that of the top portion of the base whereby it acts as a hand restraint.

2. The windshield scraper of claim 1 wherein an exterior surface of said conical base has stiffening members formed thereon.

3. The windshield scraper of claim 1 further comprising a plurality of cones projecting from the second side of the flat disk, said cones facilitating the loosening of coarse frost.

4. The windshield scraper of claim 1 wherein the scraping edge is formed by the confluence of equal opposing angles, resulting in a relatively sharp ridge or scraping surface.

\* \* \* \* \*